350/283

June 30, 1970  W. F. OTTO ET AL  3,518,569

CIRCULATING LIQUID CLADDING SYSTEM FOR LASER RODS

Filed Aug. 9, 1968

William F. Otto
William B. McKnight,
INVENTORS.

BY Harry M. Saragovitz
Edward J. Kelly
Herbert Berl
Harold W. Hilton 3,518,569
CIRCULATING LIQUID CLADDING SYSTEM FOR LASER RODS
William F. Otto, Huntsville, and William B. McKnight, Somerville, Ala., assignors to the United States of America as represented by the Secretary of the Army
Filed Aug. 9, 1968, Ser. No. 751,585
Int. Cl. H01s 3/00
U.S. Cl. 331—94.5        7 Claims

ABSTRACT OF THE DISCLOSURE

A fixture for supporting a laser rod in a high energy laser system. The laser rod is mounted concentrically in a transparent tube and a sheath of liquid is interposed between the rod and the tube. End seals provided with means for compensating for water expansion, due to the heating of the rod, is provided to prevent leakage. The end seals are provided with an inlet and an outlet which lead to a reservoir for circulation of the liquid.

DEDICATORY CLAUSE

The invention described herein may be manufactured, used, and licensed by or for the Government for governmental purposes without the payment to us of any royalty thereon.

BACKGROUND OF THE INVENTION

The laser is concerned with the amplification of light radiation incident thereupon, by a phenomena in which the incident radiation, if of an appropriate wavelength, is capable of stimulating the laser to a further emission of radiation. The incident radiation utilized to "pump" the laser rod for the stimulated emission may be obtained in many ways, such as flashlamps, photolysis, etc. The present invention utilizes, but is not necessarily limited to high energy coaxial laser pumping means in surrounding relation with a glass rod which is disposed for high energy output. In such a system the rod heats appreciably and it becomes necessary to immerse the laser rod in a coolant, such as water, to prevent damage to the rod.

Such heat impairs the efficiency of the system. Also, the heat in the envelope enclosing the rod produces differential expansion in the parts, due to the different coefficients of expansion, to induce strains in the rod causing the rod to crack. However, the liquid cladding system of the present invention provides for substantially even expansion and contraction of the parts while also serving to cool the system for repeated operation thereof.

Additional features of the liquid cladding system of the present invention are: cladding concentrates light into the rod in much the same manner as a focusing lens; more energy is consumed in the laser rod since liquid cladding reduces the internal reflection in the rod which inhibits the retention of the energy in the rod; cladding improves the efficiency of the system and permits rapid successive "firing" of the system.

It was also noted that, in operation, the uncladded end of the rods showed signs of surface damage while the portion immersed in the liquid remained free of surface damage. It is obvious, therefore, that liquid cladding eliminates surface damage to the rod.

SUMMARY OF THE INVENTION

The device of the present invention includes a fixture for mounting a laser rod in a glass housing having a plurality of laser pumping means coaxially arranged therewith. The device provides a means for interposing between the rod and glass housing, a sheath of liquid coolant, such as water, for cooling the rod.

It is an object of the present invention to provide a fixture for mounting a laser rod in a laser system in a manner which will provide for circulation of a coolant around said rod.

It is a further object of the present invention to provide such a fixture with expansion means for compensating for coolant expansion responsive to the heating of the rod.

Other objects of the invention will become more readily apparent from the following detailed description taken in conjunction with the following drawings.

BRIEF DESCRIPTION OF THE DRAWINGS

As shown in FIG. 1, the laser system 10 includes a laser rod 12 mounted axially in a housing 14. An annular space 13 is provided between the rod and housing 14. A plurality of electrodes (not shown) may be coaxially mounted around housing 14 for energization of the rod and a fixture 17 is secured to the ends of the housing for support of the rod in the housing. The rod may be ruby, neodymium or the like. Housing 14 may be of quartz, Pyrex glass or similar material.

Figure 1:
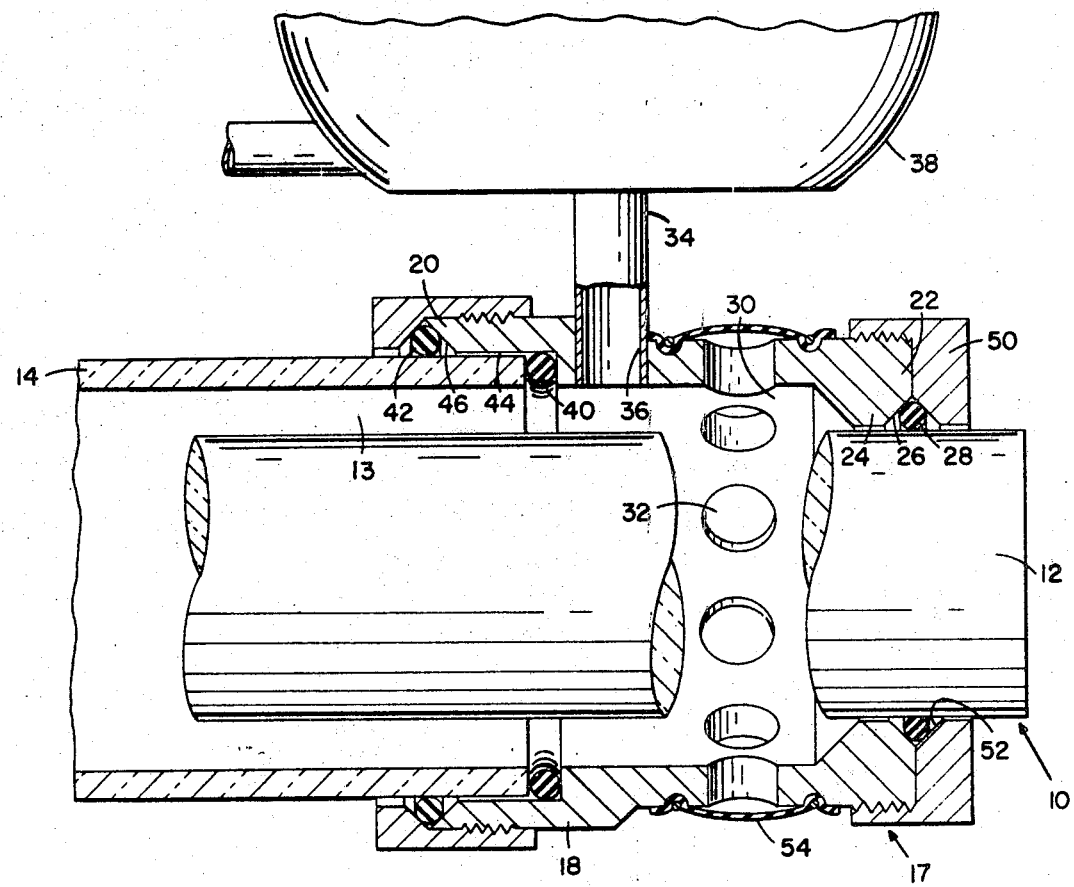
FIG. 1 is an elevational sectional view of one end of the laser assembly utilizing the fixture of the present invention.
Figure 2:
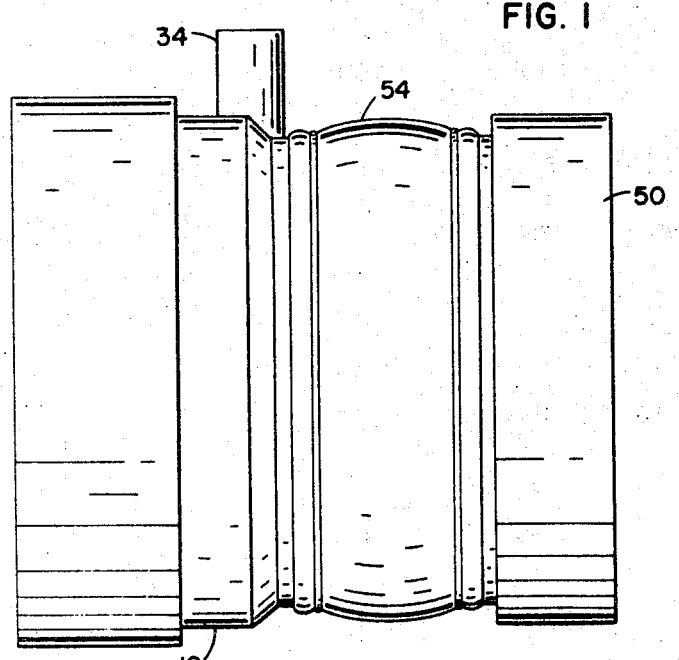
FIG. 2 is an elevational view of the fixture.

Fixture 17 includes a body portion 18 having its ends 20 and 22 externally threaded. End 22 includes an annular inwardly projecting shoulder 24 for support of rod 12 therein. End 22 is bevelled at a portion 26 thereof to receive an O ring 28 therein.

To provide a means for retention of the liquid in the fixture for circulation around the rod, the fixture is provided with a chamber 30 disposed in communication with space 13 and also in communication with a plurality of ports 32 disposed around the periphery of body 18. A conduit 34 is provided for attachment in an opening 36 in body 18 to communicate with the interior chambers 13 and 30 to direct water into or out of the chamber. The conduct 34 is connected to a reservoir 38 for circulation of the liquid. To provide for expansion of the coolant responsive to heating thereof, a resilient seal 54, of rubber or the like, is secured around the outer surface of body 18 for enclosing ports 32.

To seal body 18 to the laser assembly an O ring 42 is mounted in a cutback portion 46 of body 18. A cushion 40 is carried in a cutback portion 44 of body 18 to prevent breakage of housing 14 during assembly of the device. A nut-like member 48 is carried about housing 14 and provided with internal threads for mating engagement with the external threads on end 20 of body 18. A second nut-like member 50 is disposed around the end of rod 12 and is provided with internal threads for mating engagement with the external threads on end 22 of body 18. Member 50 is bevelled at portion 52 for coacting with the bevelled portion 26 of body 18 to receive O ring 28 therein.

It is to be understood that one of the above-described fixtures are provided at the ends of each rod and that conduit 34 could serve to supply the coolant through one opening 36 of the fixture or return the coolant through the opening from a similar opening of the other fixture.

Obviously, many modifications of the present invention may be resorted to by one skilled in the art, however, such modifications are encompassed within the spirit and scope of the appended claims.

We claim:
1. A fixture for mounting a laser rod in a housing of a laser system comprising:
   (a) a body enclosing a portion of said laser rod and disposed for support of said rod in said housing in spaced relation whereby the spacing between said housing and said rod forms an annular first chamber there between, said body having a second chamber intermediate said rod and the interior surface of said body and disposed in communication with said first chamber;
   (b) coolant means disposed in communication with said second chamber for passage of a coolant therein for circulation around said rod; and,
   (c) expansion means including a plurality of ports disposed in said body in communication with said chamber; and,
       (1) seal means including a resilient member carried about said body in enclosing relation with said ports.
2. A fixture as in claim 1 including a first member secured to said housing and disposed for threaded relation with a first end of said body for attachment of said body to said housing.
3. A fixture as in claim 2 wherein said body is provided with an inwardly projecting shoulder adjacent a second end thereof for support of said rod coaxially with said housing.
4. A fixture as in claim 3 including a second member disposed about said rod adjacent the end thereof for threaded engagement with said second end of said body for retention thereof in coaxial relation with said rod.
5. A fixture as in claim 4 including seal means disposed between said rod, said body, and said housing to prevent leakage of said coolant.
6. A fixture as in claim 5 wherein said coolant is water.
7. A fixture as in claim 6 wherein said resilient member is rubber.

References Cited
UNITED STATES PATENTS

| | | | |
|---|---|---|---|
| 3,259,017 | 7/1966 | Faulhaber | 350—283 X |
| 3,337,762 | 8/1967 | Vincent | 313—36 |
| 3,361,989 | 1/1968 | Sirons | 331—94.5 |
| 3,457,523 | 7/1969 | Wesselink | 331—94.5 |

RONALD L. WIBERT, Primary Examiner

R. J. WEBSTER, Assistant Examiner

U.S. Cl. X.R.

313—36; 350—283